(12) United States Patent
Arai (10) Patent No.: US 9,484,782 B2
(45) Date of Patent: Nov. 1, 2016

(54) CONCENTRATED POWER-DISTRIBUTION MEMBER FOR CONCENTRATED WINDING MOTOR

(71) Applicant: NISSAN MOTOR CO., LTD., Yokohama-shi, Kanagawa (JP)

(72) Inventor: Kenji Arai, Sagamihara (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 284 days.

(21) Appl. No.: 14/379,607

(22) PCT Filed: Feb. 26, 2013

(86) PCT No.: PCT/JP2013/054902
§ 371 (c)(1),
(2) Date: Aug. 19, 2014

(87) PCT Pub. No.: WO2013/129377
PCT Pub. Date: Sep. 6, 2013

(65) Prior Publication Data
US 2015/0008775 A1    Jan. 8, 2015

(30) Foreign Application Priority Data
Feb. 27, 2012   (JP) ................................. 2012-040256

(51) Int. Cl.
*H02K 3/52* (2006.01)
*H02K 3/28* (2006.01)
*H01R 39/32* (2006.01)

(52) U.S. Cl.
CPC ............... *H02K 3/28* (2013.01); *H02K 3/522* (2013.01); *H01R 39/32* (2013.01); *H01R 2201/22* (2013.01); *H02K 2203/09* (2013.01)

(58) Field of Classification Search
CPC .......... H02K 3/28; H02K 3/52; H02K 3/521; H02K 3/522; H02K 2203/09
USPC ..................................... 310/71, 208
See application file for complete search history.

(56) References Cited

U.S. PATENT DOCUMENTS

| 9,225,217 B2 * | 12/2015 | Tomita ............... H02K 11/0094 |
| 2010/0201212 A1 | 8/2010 | Urano et al. |
| 2013/0328425 A1 * | 12/2013 | Tomita ............... H02K 11/0094 310/71 |

FOREIGN PATENT DOCUMENTS

| FR | 2 780 212 A1 | 12/1999 |
| JP | 2009-027838 A | 2/2009 |
| JP | 2010-141953 A | 6/2010 |
| KR | WO 2012070751 A1 * | 5/2012 ............. H02K 3/522 |

* cited by examiner

*Primary Examiner* — Quyen Leung
*Assistant Examiner* — Eric Johnson
(74) *Attorney, Agent, or Firm* — Foley & Lardner LLP (57) ABSTRACT

A concentrated power-distribution member for a concentrated winding motor including a ring-shaped busbar and a coil connection terminal formed in one-piece with the busbar to hold a coil winding end positioned in an inner side of the busbar. The coil connection terminal has an erected portion extending from the busbar in parallel with the center axis of the busbar and a pair of arms extending from the leading end of the erected portion toward a center axis. A pair of arms is constructed by a pair of wing portions that extend to both sides of the erected portion and are bent toward the center axis along a bending line parallel to the center axis. A coil end holding portion is provided in leading ends of the pair of arms. According to this construction, a dimension of the concentrated power-distribution member is reduced.

5 Claims, 8 Drawing Sheets

CONCENTRATED POWER-DISTRIBUTION MEMBER FOR CONCENTRATED WINDING MOTOR

TECHNICAL FIELD

The present invention relates to a concentrated power-distribution member for a concentrated winding motor.

BACKGROUND ART

An end of the coil wound around a stator coil of a concentrated winding motor is connected to, for example, a ring-shaped busbar held in a holding member positioned along an outer circumference of the stator.

JP 2010-141953 A, published by the Japan Patent Office, proposes a concentrated power-distribution member comprising a busbar and a coil connection terminal for connecting coil ends.

The coil connection terminal comprises an erected portion erected from the busbar along a rotation axis direction of the motor, a horizontal portion that is bent by 90° from a leading end of the erected portion and extends toward the rotation axis of the motor, and a vertical portion bent by 90° from the leading end of the horizontal portion and erected in parallel with the rotation axis of the motor. A holding portion is formed in a leading end of the vertical portion to form a U-shape as seen along the rotation axis of the motor. The end of the stator coil is held within the U-shape.

The busbar and the coil connection terminal are formed by cutting a single band-shaped member. The coil connection terminal is bent by 90° at each of the interfaces between the erected portion and the horizontal portion and between the horizontal portion and the vertical portion. The holding portion is formed in a U-shaped cross section by bending, by 90°, each of a pair of wing portions extending to both sides from the vertical portion in a T-shape toward the center of the motor along a bending line parallel to the rotation axis of the motor.

SUMMARY OF INVENTION

In the concentrated power-distribution member according to the prior art, three bending portions are provided in the coil connection terminal. As a result, a dimension of the concentrated power-distribution member inevitably increases in the direction of the rotation axis. As the dimension of the concentrated power-distribution member increases, a dimension of the electric motor inevitably increases.

It is therefore an object of this invention to reduce a dimension of a concentrated power-distribution member used in a concentrated winding motor in a direction of a rotation axis the motor.

In order to achieve the above object, this invention provides a concentrated power-distribution member for a concentrated winding motor, comprising a ring-shaped busbar having a center axis and a coil connection terminal formed in one-piece with the busbar to hold a coil winding end positioned in an inner side of the busbar.

The coil connection terminal comprises an erected portion that has a leading end and extends from the busbar in parallel with the center axis, a pair of arms extending from the leading end toward the center axis, and a coil end holding portion provided in leading ends of the pair of arms. The pair of arms is constructed by a pair of wing portions that extend from the leading end of the erected portion to both sides of a tangential direction of the busbar and are bent toward the center axis along a bending line parallel to the center axis.

The details as well as other features and advantages of this invention are set forth in the remainder of the specification and are shown in the accompanying drawings.

DESCRIPTION OF EMBODIMENTS

Figure 1:
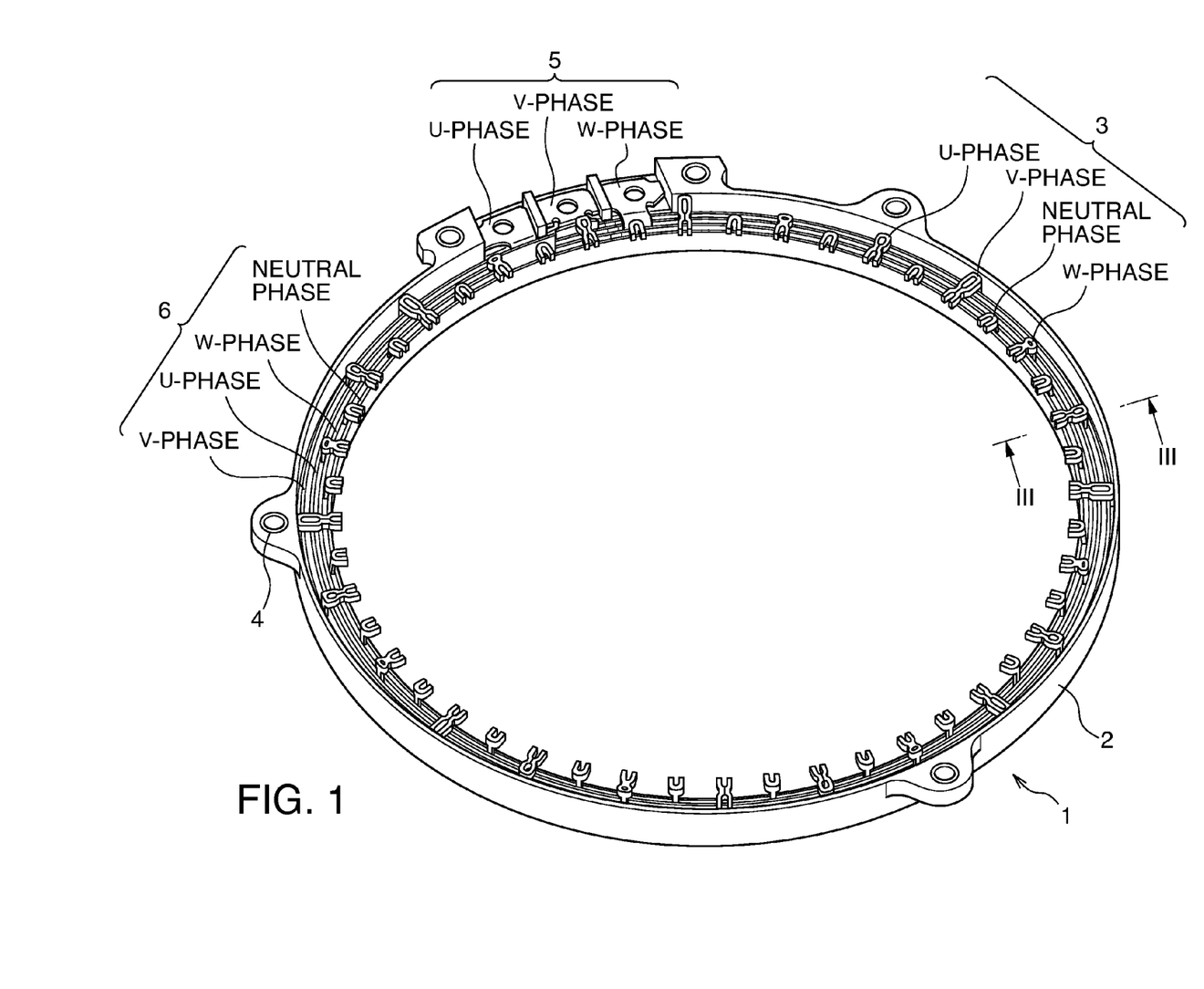
FIG. 1 is a perspective view of essential parts of a stator power-distributing portion of an electric motor including a concentrated power-distribution member according to an embodiment of this invention.

Referring to FIG. 1 of the drawings, a concentrated power-distribution member according to an embodiment of this disclosure is applied to a power-distributing portion 1 of a stator of a three-phase alternating current concentrated winding motor.

The stator is provided with a plurality of stator coils in an inner side of the power-distributing portion 1 in the figure. The power-distributing portion 1 is provided with a plurality of sets of coil connection terminals 3 as many as the number obtained by dividing a total number of the stator coils by three, which is the number of phases of the alternating current. Each set of the coil connection terminals 3 comprises a total of four coil connection terminals 3 including three coil connection terminals 3 connected to one ends of U-phase, V-phase, and W-phase coils, and a single neutral-phase coil connection terminal 3 connected to the another ends of the U-phase, V-phase, and W-phase coils.

The coil connection terminals 3 for each phase are connected to a common busbar 6. The busbar 6 is a ring-shaped member. Four busbars 6 for a U-phase, a V-phase, a W-phase, and a neutral phase are held in annular grooves of a cylindrical holding member 2 formed of an insulating material in a state where the busbars 6 are insulated with each other.

The U-phase, V-phase, and W-phase busbars 6 are connected to corresponding feed lines of each phase via busbar power electric terminals 5 fixed to the holding member 2.

The power-distributing portion 1 is fixed to a motor casing using bolts inserted through installation bosses 4.

Figure 2:
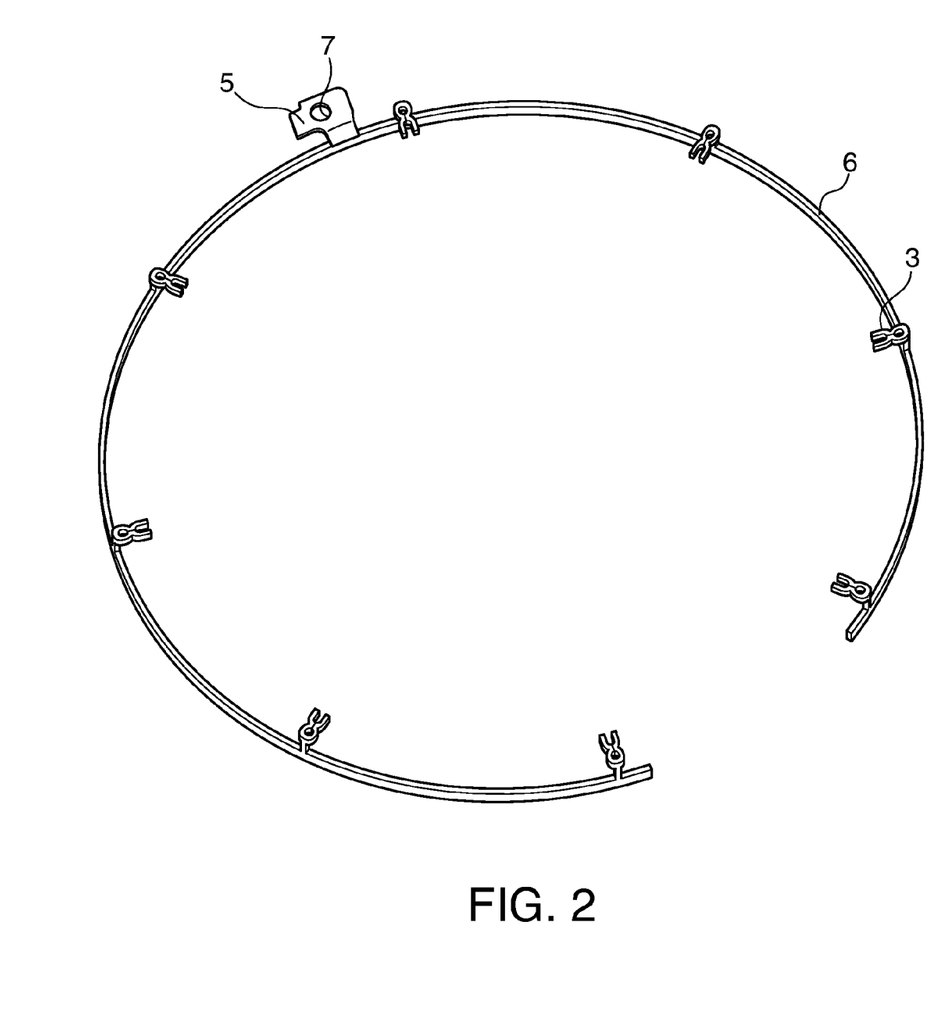
FIG. 2 is a perspective view of the concentrated power-distribution member.

Referring to FIG. 2, the busbars 6 of each phase have a partially cut ring shape. Each busbar 6 is provided with a single busbar power electric terminal 5 and a plurality of coil connection terminals 3 arranged with a constant angular interval. The busbar power electric terminal 5 is provided with a bolt hole 7 for locking the busbar 6 to the holding member 2.

Figure 3:
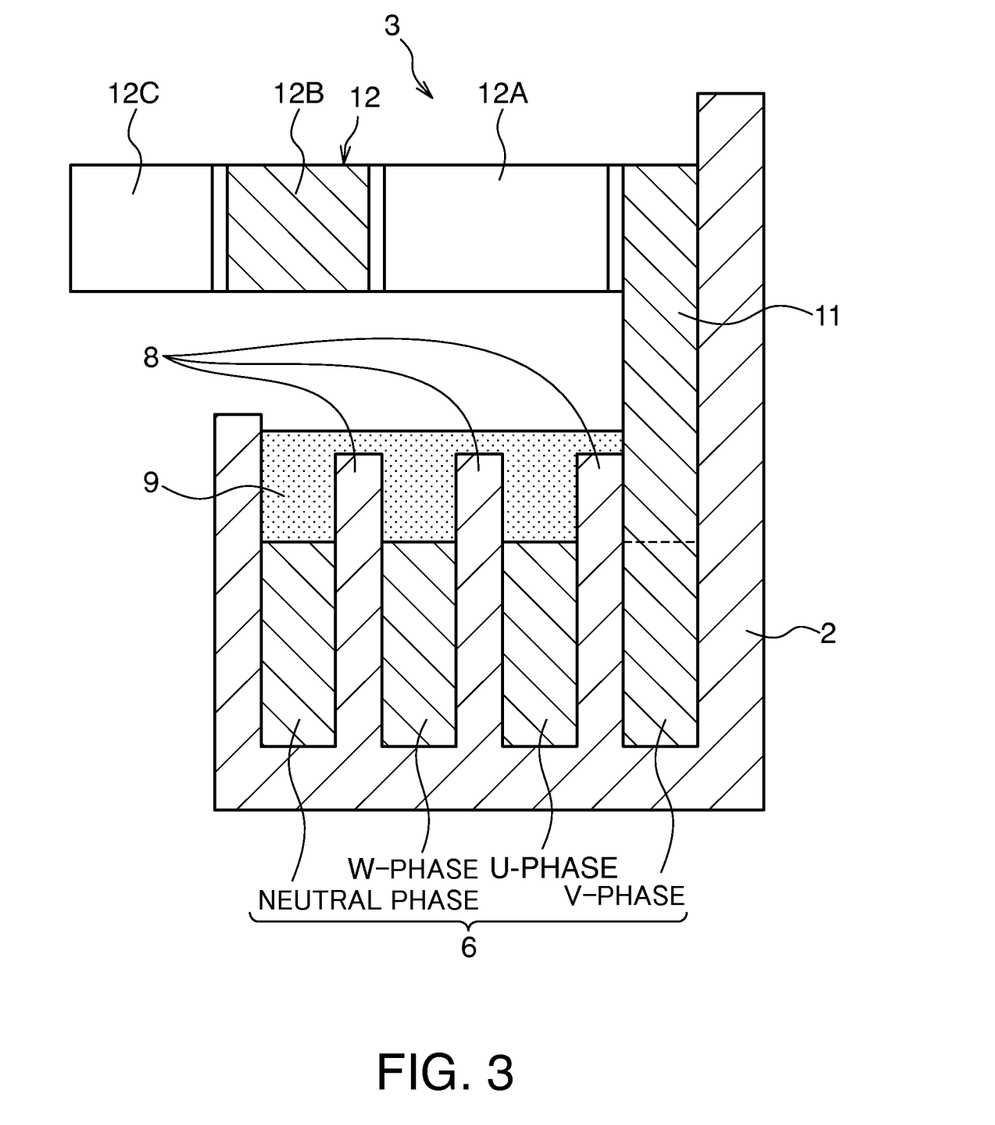
FIG. 3 is a cross-sectional view of the concentrated power-distribution member, taken along a line of FIG. 1.

Referring to FIG. 3, the coil connection terminal 3 is formed in one-piece with the busbar 6. FIG. 3 shows a case where the coil connection terminal 3 is formed in one-piece with the busbar 6 for the V-phase. The busbars 6 of each phase are fitted to the annular grooves formed in the holding member 2 concentrically with respect to a center axis. The center axis of the busbar 6 corresponds to a rotation axis of the motor. Gaps between the busbars 6 of each phase are insulated by a partitioning wall 8 that defines the annular groove. In addition, the busbar 6 is fixed to the inside of the annular grove by an insulating resin material 9 filled in the holding member 2. A vertical direction in the figure refers to a direction of the center axis of the busbar 6.

Figure 4:
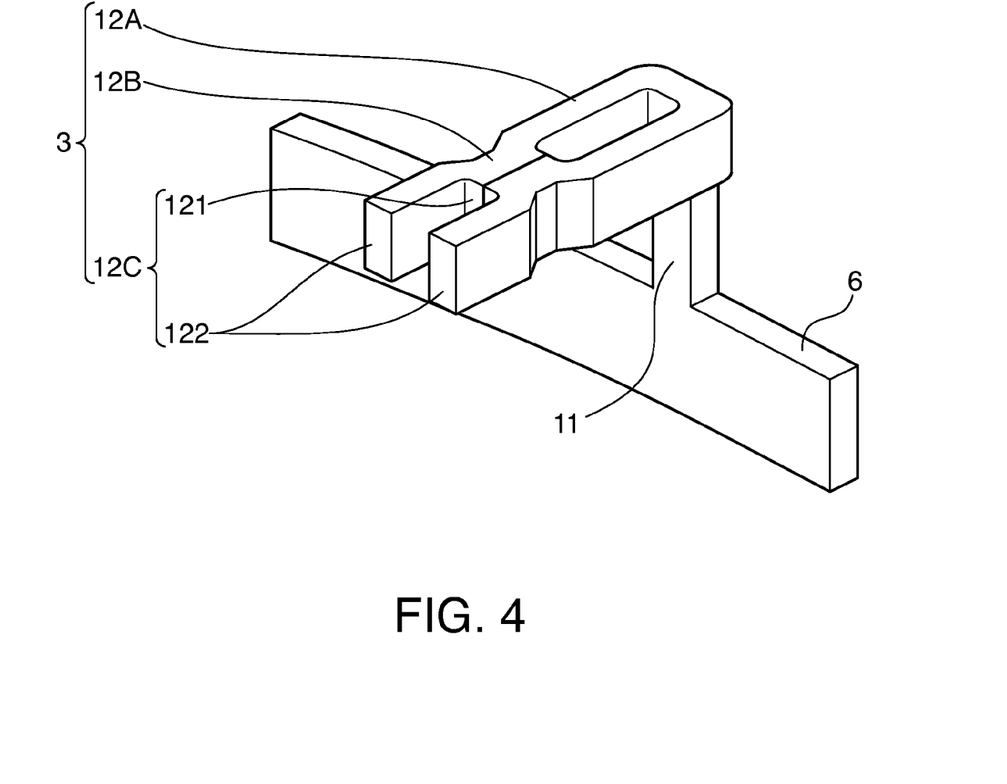
FIG. 4 is an enlarged perspective view of essential parts of the concentrated power-distribution member.

Referring to FIG. 4, each of the coil connection terminals 3 comprises an erected portion 11 extending from the busbar 6 in parallel with the center axis and a pair of arms 12 extending toward the center axis from the erected portion 11. The pair of arms 12 comprises a base portion 12A, a narrow portion 12B, and a holding portion 12C.

The pair of arms 12 is formed by bending wing-like members protruding from both sides of the erected portion 11 in tangential directions of the busbar 6, along a bending line parallel to the center axis of the busbar 6 toward the center axis. Narrow portions 12B adjoining each other are formed in the middle of the pair of arms 12. A portion extending from the erected portion 11 to the narrow portion 12B corresponds to the base portion 12A of the pair of arms 12. In addition, a portion positioned in the leading end side from the narrow portion 12B of the pair of arms 12 corresponds to the holding portion 12C. The holding portion 12C comprises forked leading ends 122 and a base end 121 closed by the narrow portion 12B, thereby forming a U-shape.

Figure 5:
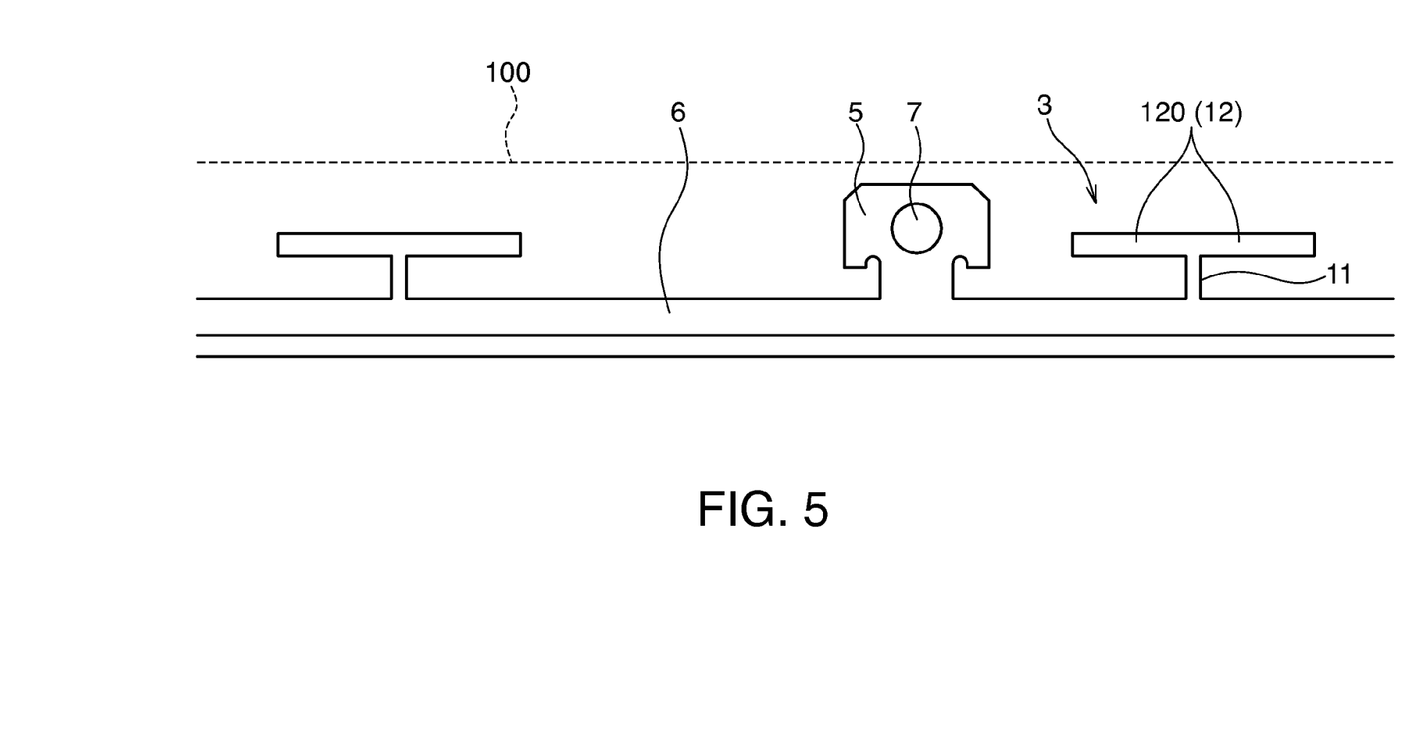
FIG. 5 is a plan view of the concentrated power-distribution member before bending.

Referring to FIG. 5, the coil connection terminal 3 is formed in one-piece with the busbar 6 together with the busbar power electric terminal 5 by cutting a band-shaped member 100 in advance. That is, as illustrated in FIG. 5, the wing portions 120 that form a pair of arms 12 afterwards and the erected portion 11 are cut from the busbar 6 in an approximately T-shape. The busbar power electric terminal 5 is also cut to protrude in the same direction. The busbar 6 thus formed in one-piece with the busbar power electric terminal 5 and a plurality of coil connection terminals 3 in advance is curved in a cylindrical shape and is fixed to the tubular groove of the holding member 2. The busbar power electric terminal 5 is bent by 90° toward the center axis of the busbar 6. As a result, the bolt hole 7 overlaps the screw hole formed in a predetermined position of the holding member 2, and the busbar 6 is positioned in the holding member 2 using a bolt installed through the bolt hole 7.

Meanwhile, the coil connection terminal 3 is fabricated in the shape of FIG. 4 through the following process.

First, the wing portion 120 protruding from both side surfaces of the erected portion 11 to the side direction in parallel with the busbar 6 is bent by 90° along the bending line parallel to the center axis of the busbar 6 curved in a cylindrical shape. As a result, a pair of arms 12 extending from the erected portion 11 toward the center axis is formed in the busbar 6 in the cylindrical shape. The narrow portion 12B is formed by facing a pair of arms 12 to each other and crimping middle portions of the pair of arms 12 using a tool. As a result of formation of the narrow portion 12B, the base portion 12A and the holding portion 12C are formed.

The concentrated power-distribution member including the busbar 6, the busbar power electric terminal 5, and a plurality of coil connection terminals 3 formed in one-piece in this manner is prepared for each of the U-phase, the V-phase, and the W-phase and is fixed to the corresponding annular groove of the holding member 2. In addition, a concentrated power-distribution member including the busbar 6 and a plurality of coil connection terminals 3 is prepared for a neutral phase and is fixed to the corresponding annular groove of the holding member 2.

It is noted that a length of the pair of arms 12 is different depending on a position of the tubular groove inside the holding member 2. As the concentrated power-distribution member is arranged in the annular groove closer to the outer circumference of the holding member 2, a distance to the coil becomes long. Therefore, for the concentrated power-distribution member arranged in the annular groove closer to the outer circumference of the holding member 2, a length of the arm 12, specifically, the base portion 12A of the arm 12 is set to be longer.

After the concentrated power-distribution members of each phase are fixed in this manner, the power-distributing portion 1 is fixed to the motor casing using bolts inserted through the installation bosses 4.

A coil winding end is fixed to the holding portion 12C as follows. Specifically, while the coil end is guided to the inner side of the fixing portion 12C having the U-shape, electrodes are connected to both outer sides of the forked leading ends 122, and a voltage is applied thereto. An electric current flows through the base end 121 of the fixing portion 12C and generates heat due to an electric resistance of the base end 121. This heat is transferred to the forked leading ends 122 and is used to melt a coat of the coil end. The coil obtained by removing the coat in this manner is fused to the forked leading end 122. This process is called "fusing."

As described above, in the concentrated power-distribution member according to this invention, a pair of arms 12 are obtained by forming a pair of wing portions 120 extending to both sides from the erected portion 11 that extends from the busbar 6 in the direction along the rotation axis of the motor in advance, and bending the wing portions 120 toward the center axis along the bending line parallel to the center axis of the busbar 6 curved in a cylindrical shape. In addition, the coil end holding portion 12C for fixing the coil end is provided in the leading ends of a pair of arms 12.

According to this construction, there is no portion protruding from the erected portion 11 in the direction of the center axis in the pair of arms 12. The coil end holding portion 12C provided in the leading end of the pair of arms 12 also does not protrude farther from the erected portion 11 in the direction along the center axis. As a result, a dimension of the coil connection terminal 3 in direction of the rotation axis of the motor is substantially equal to the dimension of the erected portion 11 in the same direction. Therefore, it is possible to suppress the dimension of the concentrated power-distribution member in the direction of the rotation axis.

As a result, a preferable effect is obtained in miniaturizing the concentrated winding motor that uses the concentrated power-distribution member. Since the coil connection terminal 3 has a simple shape having less bending portions, a structure of the concentrated power-distribution member is simplified. This makes it possible to reduce a manufacturing cost of the concentrated power-distribution member.

Further, the narrow portion 12B and the base end 121 of the holding portion 12C are formed by crimping the middle of the pair of arms 12, it is possible to easily form the holding portion 12C for fixing the coil end. Since the concentrated power-distribution member including the busbar 6 and the plurality of coil connection terminals 3 is formed by cutting a single sheet of the band-shaped member 100, it is possible to form the concentrated power-distribution member with a low cost. Moreover, as illustrated in FIG. 5, at the time of cutting, the arm 12 exists as the wing portion 120 protruding to the side direction from the erected portion 11. For this reason, it is not necessary to increase a width of the band-shaped member 100 for forming the arm 12. This also contributes to a reduction in a manufacturing cost of the concentrated power-distribution member.

Next, another embodiment of this invention will be described.

Figure 6:
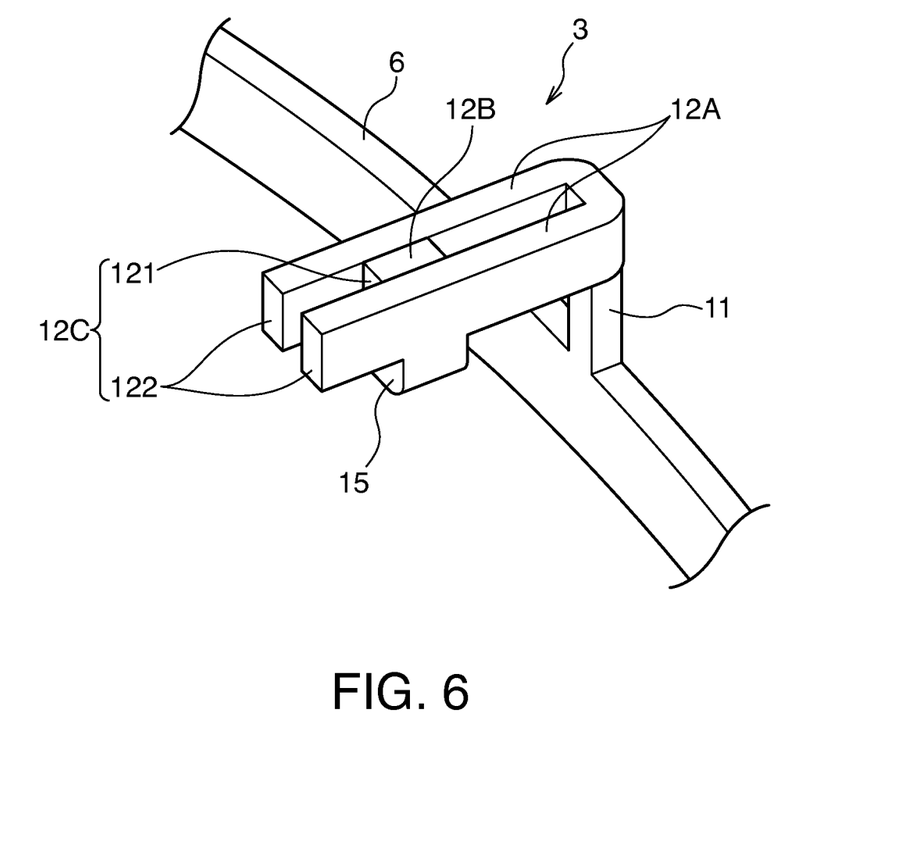
FIG. 6 is a perspective view of essential parts of the concentrated power-distribution member according to another embodiment of this invention.
Figure 7:
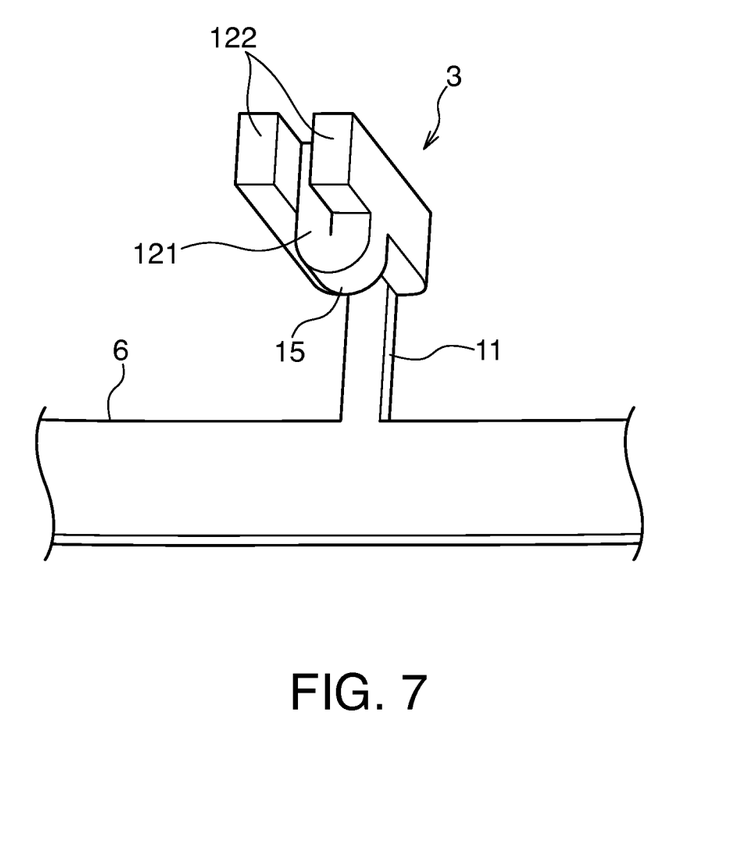
FIG. 7 is a perspective view of essential parts of the concentrated power-distribution member according to the another embodiment of this invention as seen from another direction.

Referring to FIGS. 6 and 7, the concentrated power-distribution member according to this embodiment is provided with a folding portion 15 in one of the arms 12 of the coil connection terminal 3.

In the first embodiment, the narrow portion 12B formed in a pair of arms 12 of the coil connection terminal 3 serves as the base end 121 of the holding portion 12C. However, according to this embodiment, the folding portion 15 serves as the base end 121 of the holding portion 12C.

Figure 8:
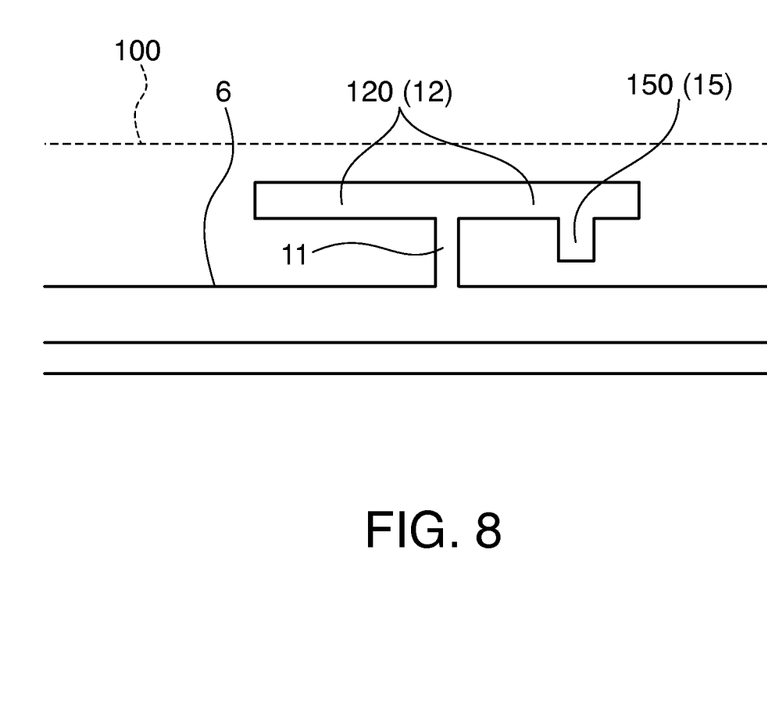
FIG. 8 is a plan view of the concentrated power-distribution member before bending according to the another embodiment of this disclosure.

Referring to FIG. 8, similar to the first embodiment, the coil connection terminal 3 is formed in one-piece with the busbar 6 by cutting the band-shaped member 100. In this case, a protrusion 150 protruding toward the busbar 6 is formed as the folding portion 15 in one of the wing portions 120. When the pair of arms 12 is formed by bending the wing portions 120 protruding to the side direction from both sides of the erected portion 11 to be in parallel with each other, the protrusion 150 is folded in a U-shape such that a leading end of the protrusion 150 is inserted into a gap between the pair of arms 12. The folding portion 15 formed in this manner serves as a base end 121 of the holding portion 12C.

In this case, since the folding portion 15 and the arm 12 that does not have the protrusion 150 are not fixed to each other, an electric resistance increases in a contact portion. However, in the fusing process described above for fixing the coil winding end to the holding portion 12C, if an inward pressure is applied from both outer sides of the leading end 122 when a voltage is applied to the forked leading ends 122 of the holding portion 12C, a contact resistance between the folding portion 15 and the arm 12 that does not have the protrusion 150 is reduced so that fusing can be performed.

According to this embodiment, a crimping process for forming the narrow portion 12B is not necessary. In addition, the protrusion 150 for the folding portion 15 is formed to extend from the wing portion 120 toward the busbar 6 when the concentrated power-distribution member is formed by cutting the band-shaped member 100. Therefore, the folding portion 15 can be formed without increasing a width of the band-shaped member 100.

The contents of Tokugan 2012-40256, with a filing date of Feb. 27 2012 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the folding portions 15 may be formed in both the pair of arms 12. In this case, when the pair of arms 12 are formed by bending a pair of wing portions 120, the protrusions 150 serving as the folding portions 15 are folded such that each of the protrusions 150 is inserted into the inner side of the pair of arms 12.

INDUSTRIAL FIELD OF APPLICATION

As described above, this invention makes it possible to reduce a dimension of the concentrated winding motor in the direction of the rotation axis. Such a concentrated winding motor is particularly advantageous when it is mounted on a vehicle having a limited space.

The embodiments of this invention in which an exclusive property or privilege is claimed are defined as follows:

The invention claimed is:

1. A concentrated power-distribution member for a concentrated winding motor, comprising:
   a ring-shaped busbar having a center axis; and
   a coil connection terminal formed in one-piece with the busbar to hold a coil winding end positioned in an inner side of the busbar,
   wherein the coil connection terminal comprises:
      an erected portion that extends from the busbar in parallel with the center axis, the erected portion having a leading end;
      a pair of arms extending from the leading end toward the center axis, the pair of arms being constituted by a pair of wing portions that extends from the leading end of the erected portion to both sides of a tangential direction of the busbar and are bent toward the center axis along a bending line parallel to the center axis; and
      a coil end holding portion provided in the leading ends of the pair of arms, and
   wherein a narrow portion is formed by deforming a middle part of the pair of arms to adjoin each other to cause the coil end holding portion to be provided in a leading end side of the pair of arms from the narrow portion and form a fork-shape.

2. The concentrated power-distribution member according to claim 1, wherein the busbar and the coil connection terminal are constructed by a band-shaped member cut and bent in a predetermined shape.

3. A concentrated power-distribution member for a concentrated winding motor, comprising:
   a ring-shaped busbar having a center axis; and
   a coil connection terminal formed in one-piece with the busbar to hold a coil winding end positioned in an inner side of the busbar,
   wherein the coil connection terminal comprises
      an erected portion that extends from the busbar in parallel with the center axis, the erected portion having a leading end and;
      a pair of arms extending from the leading end toward the center axis, the pair of arms being constructed by a pair of wing portions that extends from the leading end of the erected portion to both sides of a tangential direction of the busbar and are bent toward the center axis along a bending line parallel to the center axis; and
      a coil end holding portion provided in the leading ends of the pair of arms, and
   wherein the coil connection terminal further comprises a folding portion in a shape of a folded protrusion that protrudes from the pair of wing portions and folded into a U-shape to cause a leading end of the folding portion to be inserted between the pair of arms, and
   the coil end holding portion is formed in the arms of a leading end side from the folding portion.

4. The concentrated power-distribution member according to claim 3, wherein the protrusion is constructed by a member protruding toward the busbar from one of the pair of the wing portions.

5. The concentrated power-distribution member according to claim 3, wherein the busbar and the coil connection terminal are constructed by a band-shaped member cut and bent in a predetermined shape.

* * * * *